W. G. FORDING.
METHOD OF FORMING TIRES.
APPLICATION FILED JUNE 30, 1916.
1,422,046.
Patented July 4, 1922.
4 SHEETS—SHEET 1.
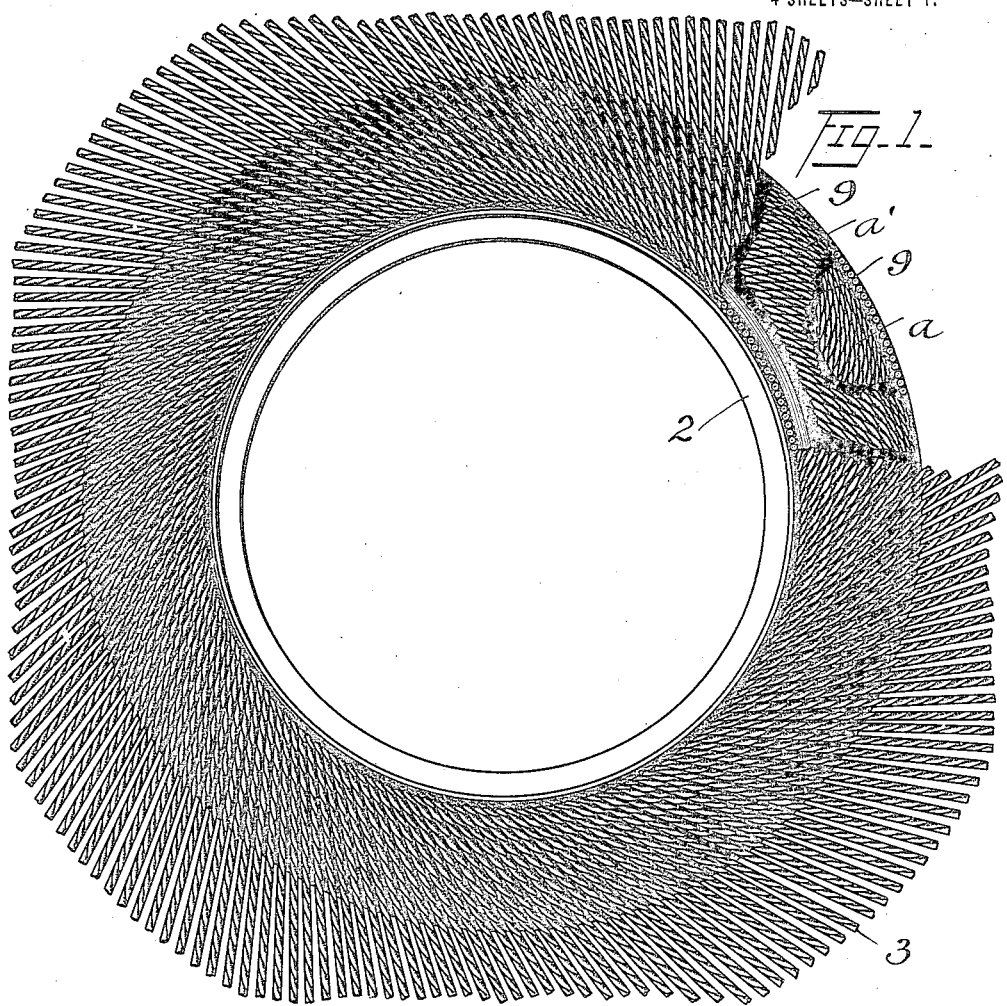
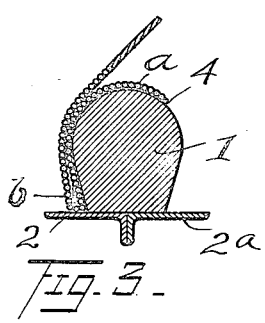
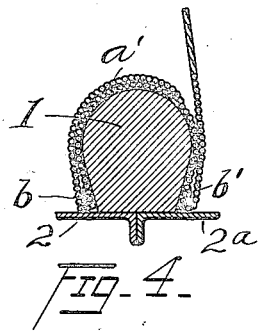
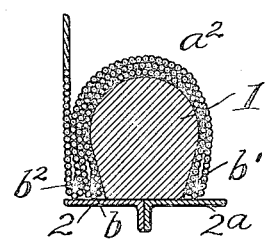
Inventor
William G. Fording
by Thurston & Kudo
Attys W. G. FORDING.
METHOD OF FORMING TIRES.
APPLICATION FILED JUNE 30, 1916.
1,422,046.
Patented July 4, 1922.
4 SHEETS—SHEET 2.
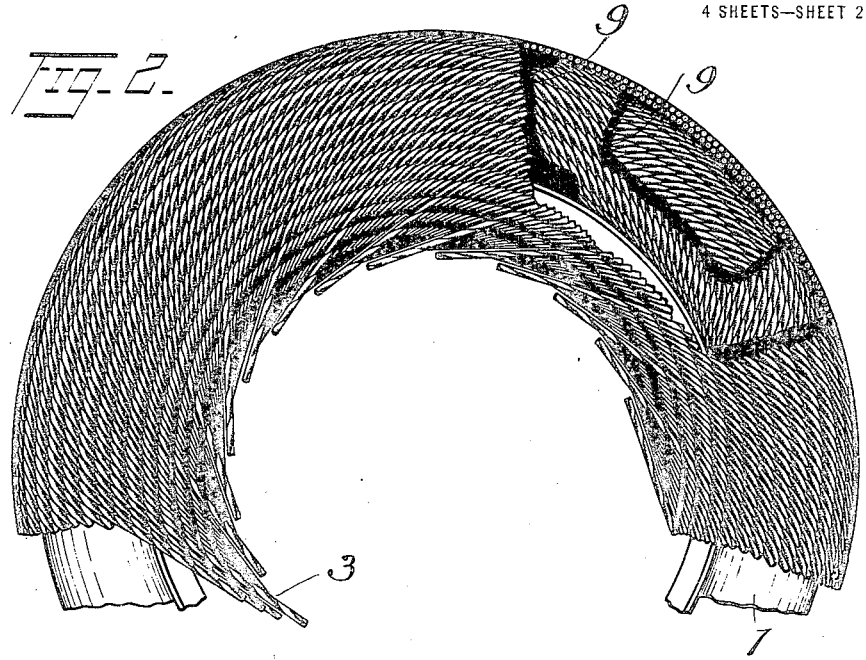
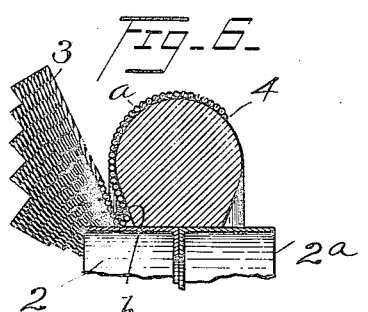
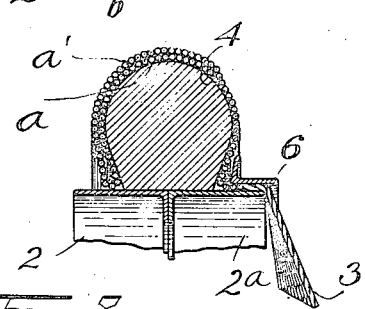
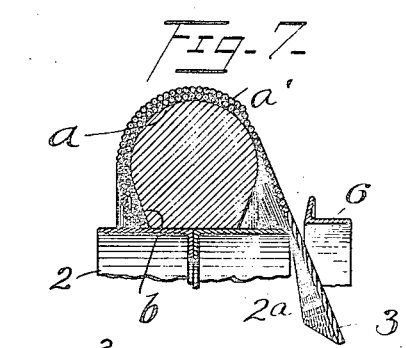
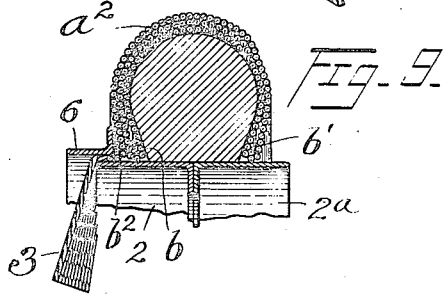
Inventor
William G. Fording
by Thurston & Kwis
Attys.

Inventor
William G. Fording
by Thurston & Kwis

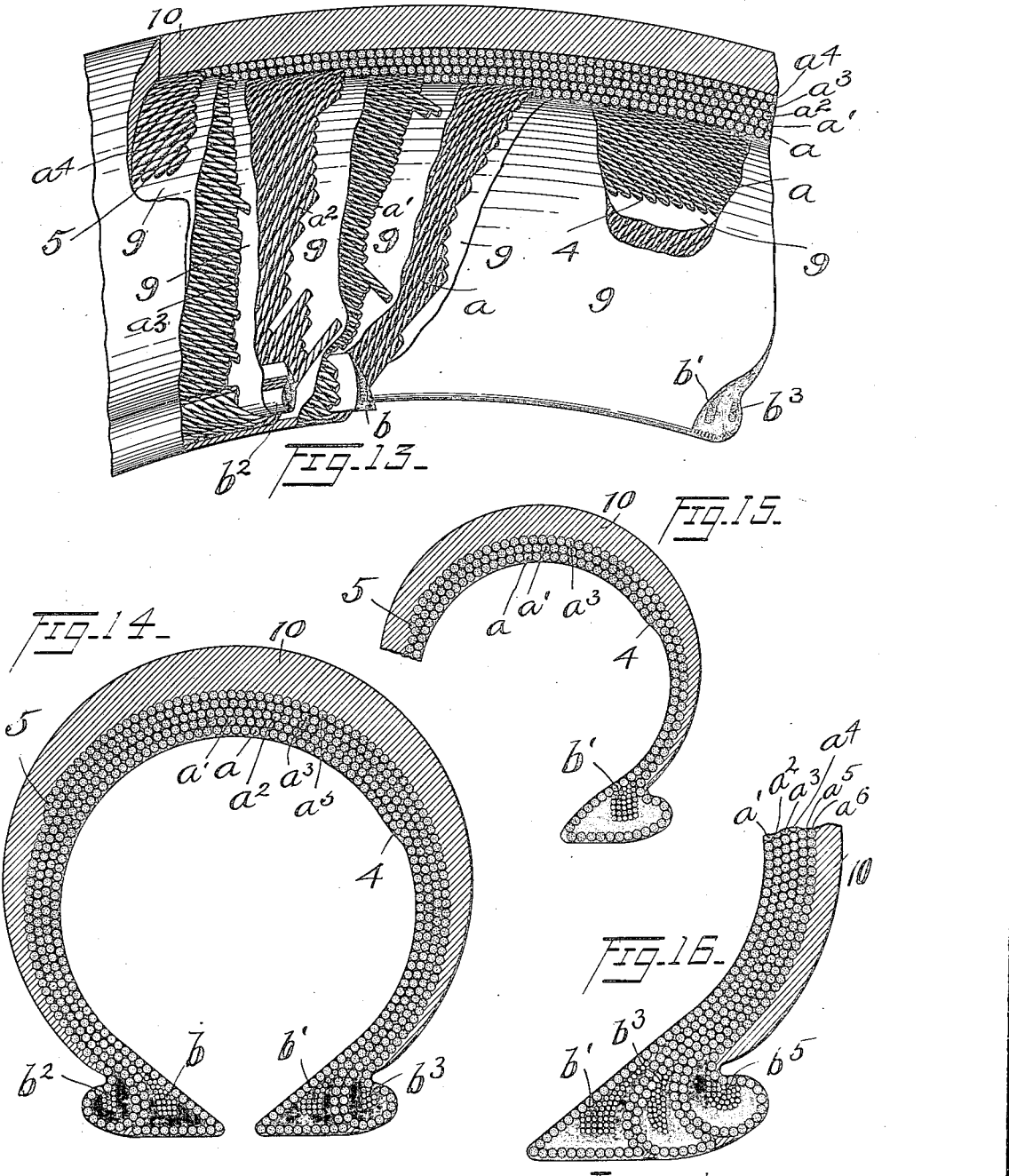

UNITED STATES PATENT OFFICE.

WILLIAM G. FORDING, OF CLEVELAND, OHIO, ASSIGNOR TO THE FISK RUBBER COMPANY, OF CHICOPEE FALLS, MASSACHUSETTS, A CORPORATION OF MASSACHUSETTS.

METHOD OF FORMING TIRES.

1,422,046.  Specification of Letters Patent.  Patented July 4, 1922.

Application filed June 30, 1916. Serial No. 106,759.

*To all whom it may concern:*

Be it known that I, WILLIAM G. FORDING, a citizen of the United States, residing at Cleveland, in the county of Cuyahoga and State of Ohio, have invented a certain new and useful Improvement in Methods of Forming Tires, of which the following is a full, clear, and exact description.

This invention relates to a method of making tires, or tire shoes for automobiles and the like, and has particular reference to so-called cord tires, the fabric or stress resisting portion of which is formed from cords as distinguished from woven fabric.

The main object of the invention is to provide a method by which strong and durable tires can be made quickly and inexpensively. Another object is to provide a method which admits of a tire being formed in any size, or with any desired number of layers of fabric, particularly the cord fabric, without requiring any material change in the apparatus by which the tire carcass is built up. A still further object of the invention is to form cord tires in such a way that the cords of all the layers, and the individual cords of each layer are all of the same tension; wherein the cord fabric is free from circumferential laps or joints, and loose ends of cords; and which contains no pockets or deposits of air.

The above and other objects are attained by my invention which may be briefly summarized as consisting in certain novel steps of the method which will be described in the specification and set forth in the appended claims.

Figure 10:
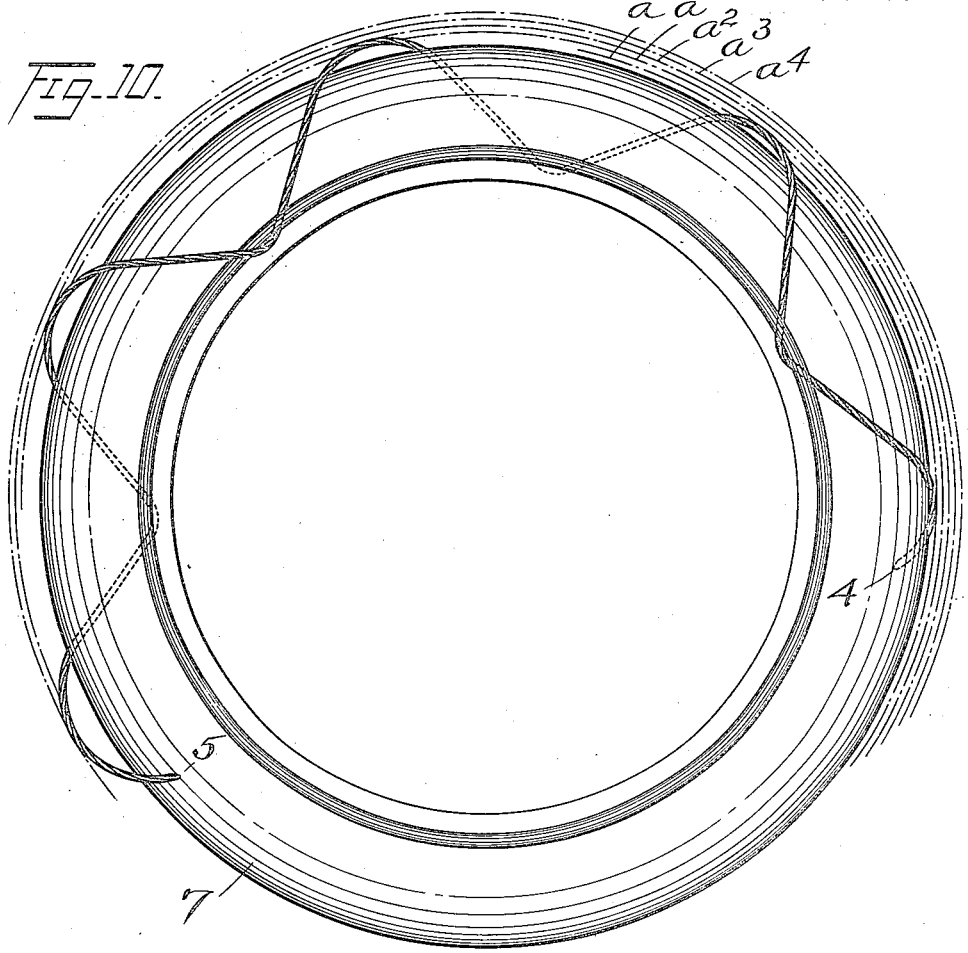
Figure 11:
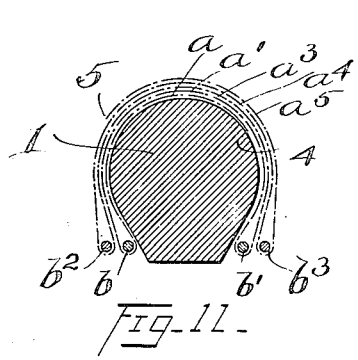
Figure 12:
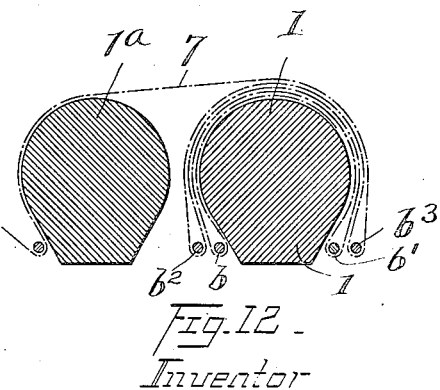

In the accompanying drawings, which illustrate the preferred way of carrying out my invention, Figs. 1 and 2 are side views of a core and partially formed tire carcass showing the manner in which the successive layers of fabric are formed from a continuous sheath of cords; Figs. 3 to 9 are cross-sectional views through the core and partially formed tire, these views illustrating different steps in the process of constructing a tire having a plurality of layers made in accordance with my invention; Fig. 10 shows a side view of the core, and by dotted lines illustrates the several superposed layers, and in full and dotted lines illustrates the course of one individual cord which is incorporated in all the different layers; Fig. 11 is a cross-sectional view of the core, showing by dotted lines, the various superposed layers which make up the cord fabric; Fig. 12 shows in cross-section, two cores, this view illustrating the manner in which, upon the completion of the fabric portion of one tire, without interruption, the process is continued in building up the fabric portion of another tire on an adjacent core; Fig. 13 shows in side elevation, with portions broken away, a section of a four-layer tire made in accordance with my invention; Fig. 14 is a cross-sectional view of the same; and Figs. 15 and 16 are cross-sectional views through portions of tires having respectively two layers and six layers.

In carrying out my invention I form a tire or tire carcass, including the fabric and bead portions thereof, by passing cords or equivalent tire-forming material back and forth a plurality of times over a suitable core from one side thereof to the other, and loop the tire-forming material around bead units or sections which act as retainers for the successively applied layers and the number of which depends upon the number of layers which is to be incorporated in the tire. Preferably the tire-forming material consists of cords, generally rubberized and formed of twisted strands of fibrous material, and preferably the cords are in the form of an endless sheath which extends entirely around the core; that is to say, a sufficient number of cords are arranged side by side, in close proximity at the rim portion of the tire, to extend entirely around the core, or to form one complete layer.

In thus forming a tire carcass, the different layers, no matter how many there may be, are formed from the same cords which are continuous from the beginning of the innermost layer to the ending of the outermost layer, and as an even tension is maintained on the cords in forming the different layers, all of the latter are enabled to bear or sustain equal portions of the stresses to which the tire fabric is subjected when the tire is in use. Additionally, in forming the successive layers the cords or portions of the cords forming each layer are caused to extend at an angle to the cords of the adjacent layer or layers, and there is preferably incorporated in the tire, layers of rubber which are placed between the successive cord layers as the latter are formed, and as the different bead sections are applied.

With this brief preliminary description, reference is had to the accompanying drawings which show the preferred embodiment of my method, and the preferred type or form of tire-forming material, namely, rubberized cord.

It will be seen that the tire carcass is built up onto an annular core 1, at the inner periphery of which are a pair of bead rings 2 and $2^a$ which in reality form a part of the core, and are fixed with respect thereto throughout the period that the tire carcass is being built. They are, however, separate and removable from the core 1, for the purpose which will be referred to presently. The core 1, in practice is collapsible and may be of any suitable form and construction.

The tire carcass is built up from a sheath of cords 3, which, as before stated, is composed of a large number of separate or individual cords, the number of which is such that the sheath extends entirely around the core when the cords are arranged side by side, the cords being in closest proximity at the inner periphery of the core 1, or at the bead rings 2 and $2^a$. The cords, which extend from suitable spools or separate sources of supply not shown, are preferably handled in groups, which, when the cords extend inwardly beyond the bead rings as shown in Fig. 2 and Figs. 7, 8 and 9, may be slightly twisted so as to accommodate the cords in the reduced space. In forming the fabric or tire carcass, the innermost layer may be started at any desired point, but preferably at or about the point or line 4, indicated most clearly in Figs. 3 and 6; then the sheath is passed around the core 1, down to the bead ring 2, so as to form the innermost layer $a$, with the cords extending diagonally downward beyond the bead ring, substantially in the manner indicated in Fig. 2; then the first bead section or bead unit $b$ is placed in position, after which the entire sheath of cords is looped or folded around the bead and is passed back over layer $a$ around the core to the opposite side thereof, or to the other bead ring $2^a$, to form the second layer $a'$; then the bead section $b'$ is applied, and the sheath of cords is then looped around this bead section and is passed back again over the core and over layer $a'$ to the bead ring 2, where the next bead section $b^2$ is placed in position at the side of the first bead section $b$, after which the sheath of cords is again looped or passed back around the core to form the next layer $a^3$, and then the fourth bead section $b^3$ is applied at the side of the bead section $b'$. This is continued until a tire carcass of the desired number of layers is formed with the desired number of bead sections. Finally the outermost layer is terminated at or about the point or line 5, which is indicated clearly in Figs. 11, 14 and 15.

In placing in position the different bead sections, I employ bead-forming rings such as shown at 6 in Figs. 7, 8 and 9. These bead-forming rings are moved inwardly over the rings 2 and $2^a$, and over the sheath of cords in the manner indicated in Figs. 7, 8 and 9 so as to press the same inwardly and cause them to conform to the shape of the core. After the bead is applied the bead ring is removed so that the sheath may be again passed back over the core to form the next layer. The beads, or individual bead sections, may be formed of any desired material, and may be made into any desired shape, the shape or form of the bead sections depending in part upon the shape of the bead-forming rings, the cross-sectional shape of which will depend upon the cross-sectional shape of the bead section, or the type of bead which is to be incorporated in the tire. As before stated, any desired material may be employed in forming the bead sections, such as the braided or cabled wire customarily used in tires of the straight-side type, but I prefer to form them, at least in part, of cords or threads which are wound spirally in place between the cords and the bead-forming rings, and I may, in addition to the annular series of wound threads or cords, employ a solid member such as a band of wire, or a ring of rubber such as is illustrated in Figs. 13, 14, 15 and 16.

As shown in these figures just mentioned, the ring of rubber which is preferably a sectional ring with the ends of the sections abutting, is provided with a slot or groove in which the strand of spirally wound material is laid. Further description of the form of the bead, or of the method of incorporating the same in the tire need not be given herein as the same constitutes the subject matter of a companion application Serial No. 104,391 filed by me on June 19, 1916.

In forming the tire carcass in the manner above explained, the cords of each layer, or rather the portions of the cords forming each layer, are parallel, and they extend diagonally around the core, as is illustrated in several of the figures of the drawing. After the formation of each layer, by causing a suitable relative movement between the core and the cords, such as can be obtained by turning the core slightly through a predetermined arc, the portions of the cords of the successive layers are caused to extend around the core always at a given angle with respect to the portions of the cords of the adjacent layer or layers. In fact, as will be observed particularly from Figs. 1, 2 and 13, the portions of the cords in each layer extend at substantially right angles to the portions of the cords of the adjacent layer or layers. As before stated, in applying the different layers, that is, in passing the sheath of cords back and forth over the core and around the individual bead sections, the sheath of cords is maintained under uniform tension, and the individual cords of the sheath are all under the same tension. This is a feature of great importance, as the even and uniform tension of the cords, or portions of the cords in the several layers, has much to do with the strength and life of the tire.

At this point brief reference may be made to Figs. 3 to 9 which show a tire in various stages of manufacture. Fig. 3 shows the innermost layer applied to the core, and the second layer partly applied; Fig. 4 shows the first and second layers applied, and the starting of the third layer; Fig. 5 shows the first, second and third layers applied, and the beginning of the fourth layer; Fig. 6 is a view somewhat similar to Fig. 3, showing a portion of the sheath about to be passed back around the core to form the second layer; Fig. 7 shows the bead-forming ring 6, about to be applied just prior to applying the bead section $b'$; Fig. 8 is a similar view just after the bead section $b'$ is applied; and Fig. 9 is a similar view with the first three layers on the core, and with the bead sections $b$, $b'$ and $b^2$ in place. These figures indicate quite clearly the successive steps of the process in forming the tire carcass including the successive layers and the different bead sections, it being understood that the process is such that it is applicable to any desired size of tire. In fact, it is one of the features of this invention that I am enabled to form relatively small cord tires as well as relatively large sizes, and in this respect my invention has advantages over the methods in use at the present time of forming cord tires, for it is a well-known fact that heretofore the smaller sizes of tires could not be advantageously formed from cord fabric. It might be said also in this connection, that practically no change is required in the apparatus aside from the change in the size of the core in forming different sizes of tires, or tires of different numbers of layers.

In Fig. 10 I have shown by dot and dash lines, the center lines of the successive layers which are applied on the core, these layers being designated $a$, $a'$, $a^2$, $a^3$ and $a^4$, and in this same figure I have shown the course of one of the multiplicity of cords which are incorporated in all the different layers. In Fig. 11 I have shown a cross-sectional view of the core, and as in Fig. 10, have shown by dot and dash lines, the center lines of the layers $a$ to $a^4$, and have indicated by circles, the bead sections $b$, $b'$, $b^2$ and $b^3$, this view further illustrating the important fact that the cords, or tire-forming material, extend in unbroken succession back and forth from one side of the tire to the other.

In Fig. 12 I have illustrated the preferred way of applying the outer layer of one tire and beginning the inner layer of another tire without stopping or interrupting the process. As one tire is being completed on the core 1, a second core $1^a$ in all respects similar to the core 1, is brought up adjacent to the core 1, and at the proper side thereof, so that as the cords are brought over the core 1 to form the last layer, they are extended over and around the core $1^a$, and the innermost bead section $b'$ is placed in position; then the cords are severed approximately midway between the two cores, or at the point or along the line 7, the ends of the cords then being laid in place to form the ending point or line 5 of the finished carcass, and the starting point or line 4 of the carcass, the construction of which is being started.

Between the individual layers, and between the innermost layer and the core 1, are preferably placed layers 9, of unvulcanized rubber which eliminate friction between the layers. These layers of rubber, which are shown in Figs. 2 and 13, are desirable, but are not absolutely essential to the invention.

After the tire carcass has been completed on the tire-forming core, rubber to form the tread 10, is applied, after which the tire is ready for vulcanization. Preferably the tire is vulcanized on the core, after which the core can be collapsed and removed from the finished tire.

In Fig. 13 I have shown a side view of a section of what is termed a four-layer tire, the carcass of which is built up by my improved method, and in Fig. 14 I have shown a cross-sectional view of the same. Portions of the outer covering 10, of rubber, also portions of the different layers $a$ to $a^4$ of the cord fabric, of the layers of rubber 9, as well as of the different bead sections $b$ to $b^3$, are broken away to more clearly illustrate the structure. It may be noted at this point, that while the tire here shown, is termed a four-layer tire, there are in reality, five layers, due to the fact that the innermost and outermost portions overlap, because the innermost layer is started along the line 4, and the outermost layer is terminated along the line 5. There is thus provided at the tread, an extra layer of the cord fabric, this extra layer being thus provided where it will be most useful for wear and stress resisting purposes.

In Fig. 15 I have illustrated a portion of a two-layer tire, with the extra layer at the tread, the layers being designated $a$, $a'$ and $a^2$. It will be observed that this tire has a single bead section at each side, one of which is shown at $b'$. It will be understood that this tire is formed by exactly the same process used in forming the tires of four or more layers, the only difference being that with a two-layer tire the process of forming the carcass is not continued so long or so far as with the tires having four, six, or more layers.

In Fig. 16 I have shown a portion of a tire having six full layers, designated $a'$ to $a^6$, and an extra layer at the tread, which extra layer is not shown but will, of course, correspond to the innermost layer $a$ of the other tires shown. A tire having this number of layers requires three bead sections at each side, the three bead sections shown being designated $b$, $b^3$ and $b^5$.

Figs. 14, 15 and 16 indicate the flexibility of the method, both as to the number of layers which may be incorporated in the tire by the method, and as to the shape and size of the beads which are formed. It will be noted that while in these three figures I have shown beads of the clincher type, each bead being composed of one, or a plurality of the bead sections or units appropriately shaped, it will be obvious that beads of any other type, such as the straight sided bead, may be applied. It is to be noted also, that while I have illustrated what I have termed two, four and six-layer tires, the invention may be utilized for forming a tire having more than six layers if desired.

Having thus described my invention, what I claim is:

1. The method of making a tire carcass which comprises passing a circumferential series of separately supplied strands back and forth from one side of a tire-forming support to the other so as to form a plurality of successive layers.

2. The method of making a tire carcass which comprises passing back and forth from one side to the other of a tire-building support a circumferential series of separately supplied strands of relatively unlimited lengths sufficient in number to circumferentially encompass the support.

3. The method of making a tire carcass which comprises passing tire-forming material back and forth across a tire-building support from one side thereof to the other so as to form successive reversely folded layers of continuous material, and looping the same around individual bead sections at the beginning and end of each complete passage across the support.

4. The method of making a tire carcass which comprises passing back and forth from one side of a tire-building support to the other a circumferential series of separately supplied strands of relatively unlimited lengths, and successively applying bead sections so that the sheath can be looped around said sections.

5. The method of making a tire carcass which comprises passing back and forth in reverse folds across a tire-building support a sheath formed of separated strands, the strands being supplied in sufficient lengths to construct a plurality of tire carcasses.

6. The method of making a tire carcass which comprises passing a circumferential series of separately supplied strands back and forth from one side of a tire-building support to the other so as to form a plurality of successively applied layers formed of strands continuous throughout the several layers, the individual strands being carried diagonally across the support so that the strands of each layer are at an angle to the strands of each adjacent layer.

7. The method of making a tire carcass which comprises passing simultaneously across a core a plurality of separately supplied strands in sufficient number to constitute a complete layer, and repeating the passing of the strands back and forth across the core until a carcass of the desired number of layers has been built up.

8. The method of making a tire carcass which comprises laying a sheath of tire-forming material around a core to one side thereof so as to form the first layer, applying an annular bead unit to the material at said side of the core, passing the tire forming material back over the core to the opposite side thereof, placing a similar bead unit in position upon the material at the second side of the core, passing the material back to the first mentioned side and placing a bead unit in position at the side of the first-named bead unit, and thus continuing the alternate formation of layers of tire-forming material and insertion of bead units until a carcass of the requisite number of layers and bead units is formed.

9. The method of making a tire carcass which comprises locating so as to form a circumferential sheath portions of a series of separately supplied strands of relatively unlimited lengths, laying upon a tire building support portions of the strands adjacent the end of the sheath, and reversely folding the sheath upon the support until a carcass of the desired number of layers has been built up.

10. The method of making a tire carcass which comprises locating so as to form a circumferential sheath portions of a series of separately supplied strands of relatively unlimited lengths, laying portions of the strands adjacent the end of the sheath upon a generally convex core, reversely folding the sheath over the core until a carcass of the desired number of layers has been built up, and restricting the strands to the bead circumference of the core by individual bead sections enclosed within each reverse fold.

11. That improvement in methods of making a cord tire structure for incorporation in a tire shoe which consists in forming an inner layer by applying one end of a sheath composed of unconnected separately supplied strands to the outer face of a forming-core, said sheath being of sufficient diameter and length to make the complete structure of a tire carcass with the strands of the inner layer extending diagonally with respect to the plane of the core, folding the entire sheath back on itself and over the first layer to form the second layer with the fold line near one inner edge of the structure and with the strands of the second layer arranged at approximately right angles to the strands of the first layer, applying a bead core to the outer face of said second layer, folding the sheath around said bead core and over said second layer with the strands thereof disposed at right angles to the strands of the second layer to form a third layer, applying a bead core to the outer face of the said third layer and on the opposite side of said structure from the first named bead core, and then folding said sheath over the third layer with the strands thereof disposed at right angles to the strands of the third layer.

12. That improvement in methods of making a structure for incorporation in a tire shoe which consists in folding a sheath composed of separately supplied strands and of sufficient diameter entirely to encompass the structure and form a complete layer of the structure laterally from side to side across a forming core, to thereby provide repeated layers of strands with the fold lines of the sheath disposed near the inner edges of said forming core and with the strands of alternate layers arranged at right angles with respect to each other and oblique to the longitudinal line of the structure.

13. That improvement in methods of making a structure for incorporation in a tire-shoe which consists in folding a sheath composed of separately supplied strands, said sheath being sufficient in size to form at one folding operation a complete envelop or layer for the structure, folding said sheath reversely back and forth over a core to form repeated layers of strength-giving material with the fold lines of the sheath disposed near the inner edges of said forming core, with the strands of alternate layers disposed at approximately right angles to each other and all of said cords at an angle with respect to the longitudinal line of the structure.

14. The method of building a tire carcass comprising as a step, carrying a circumferential series of separately supplied strands across a generally convex core so that lengths thereof project beyond the core to a circumference at least as small as the bead circumference of the core, restricting the series to the bead circumference by an annular anchorage, and carrying the series back towards the core.

15. The method of laying building material on a core in the building of a tire carcass comprising holding adjacent one side of a generally convex tire building core a circumferential series of separately supplied strands sufficient in number to form a layer, and carrying all such strands diagonally over the core.

16. The method of building a tire carcass on a core comprising holding adjacent one side of the core a circumferential series of separately supplied strands sufficient in number to form a complete layer, carrying the series diagonally across the core, securing the series adjacent the opposite side of the core, and repeating the process of carrying the series diagonally across the core and securing them in place until the desired number of plies has been built up, the path of each individual strand progressing in a zig-zag manner along the circumference of the core.

17. The method of laying successive courses of tire building material upon a core in the manufacture of a tire carcass comprising holding a circumferential series of separately supplied strands adjacent one side of the core, carrying the series across the core, securing the series adjacent the opposite side of the core, and repeating the carrying and securing operations alternately until the desired number of layers has been built up.

18. The method of laying successive courses of tire building material upon a generally convex core in the manufacture of a tire carcass comprising holding a circumferential series of separated strands adjacent one side of the core, carrying the series across the core, restricting the series to the base of the core on the second side of the core by an encircling annular anchorage, and repeating the carrying and restricting operations alternately until a carcass of the desired number of layers has been built up.

19. In the art of building the carcass of a tire casing the use of a circumferentially complete series of separately supplied strands, and the carrying of all of said elements across a building support to thereby lay a circumferentially complete ply.

20. The method of building the carcass of a tire casing on a core comprising holding adjacent one side of the core a circumferentially complete series of separated strands, each strand being sufficient in length to pass through the desired number of courses, carrying the series diagonally across the bore, restricting the series to the bead diameter of the core on the second side by an encircling annular anchorage, carrying the series diagonally across the core in a second course in which the strands cross the strands in the first course, restricting the series to the bead diameter of the core on the first side by an encircling annular anchorage, and repeating the carrying and restricting operations alternately until the desired number of courses have been laid, the path of each individual strand progressing circumferentially in a zig-zag manner and progressively from the inside course to the outside.

21. The method of building a tire casing which includes securing adjacent one side of a core a circumferentially complete series of strands, and forming a complete ply on the core by carrying groups of adjacent strands across the core.

22. The method of building a tire casing which includes securing adjacent one side of a convex core a circumferentially complete series of strands, forming a complete ply upon the core by carrying groups of adjacent strands across the core and down the second side thereof, and twisting each group separately to permit the whole series of cords to lie well within the inner circumference of the core.

23. The method of making tires with the layers formed from continuous material which comprises passing tire-forming material back and forth around a core from one side thereof to the other, and after the desired number of layers are applied to the core, passing the material around a second core and severing the material between the cores.

24. The method of forming tires which comprises passing a multiplicity of cords back and forth around a core from one side thereof to another so as to form a plurality of layers, and, when a number of layers have been applied, passing the cords around a second core, and then severing the cords between the two cores, whereby the severed ends may be applied to the two cores.

25. In the successive building of tire carcasses the steps of building up a carcass in a plurality of plies from material continuous throughout the several plies, carrying the building material from the built-up carcass into position for building a second carcass, starting the building of a second carcass, and severing the material between the carcasses.

26. The method of successively building annular tire carcasses which comprises constructing a carcass in a plurality of plies from a circumferential series of strands continuous throughout the several plies, carrying the series while still joined in the first carcass into position to start a second carcass spaced axially from the first, securing the series in said position, and thereafter severing the series of strands between the carcass and said position.

27. The method of successively building laminated circular articles which comprises constructing an article in a plurality of plies from a circumferential series of strands continuous throughout the several plies, constructing from the same strands a succession of articles each spaced axially from the preceding, and severing the series from an article only after the construction of a succeeding article has been started.

28. The method of building a plurality of laminated circular articles which comprises laying the material back and forth in circumferentially complete arrangement to form an article, carrying the material from the built-up article, and laying it back and forth to form a succeeding article.

29. The method of successively building annular tire carcasses which comprises constructing a carcass upon a convex core from circumferentially arranged material, carrying the material directly from the crest of the built-up carcass to the crest of a second core, and severing the material between the cores.

30. The method of successively building annular tire carcasses which comprises constructing a carcass in a plurality of plies upon a convex core from a circumferential series of separated strands continuous throughout the several plies, carrying the series while still joined in the first carcass from the crest thereof to the crest of a second core spaced axially from the first, and thereafter severing the series of strands between the cores.

31. The method of building a tire carcass which comprises reversely folding across a circular tire-building support a circumferential series of separated strands, maintaining the strands taut and under individually uniform tensions, and securing the series at each reverse fold to maintain the tension.

32. A method of making a tire carcass including separately supplying a circumferential series of strands in converging relation, and laying the strands upon a tire building support.

33. A method of making a tire carcass including separately supplying a circumferential series of strands in converging relation, and laying the strands back and forth in reverse folds upon a tire building support.

34. A method of making a tire carcass including separately supplying a circumferential series of strands in converging relation, and progressively applying the inner portions of the strands to a tire building support.

35. A method of building a tire carcass including attaching all of a circumferential series of separately supplied strands to a building core adjacent the bead diameter, and folding them back and forth in reverse folds from bead to bead while causing said strands to uniformly converge toward the bead and diverge toward the tread during the folding operations.

36. In the building of a tire casing, carrying across a building support and to one side hereof a circumferential series of separately supplied cords, positioning upon the cords an annulus of tire building material, and securing the annulus in place at the bead line by folding the cords around it and back across the building support.

In testimony whereof, I hereunto affix my signature.

WILLIAM G. FORDING.